US006303685B1

(12) United States Patent
Groves

(10) Patent No.: US 6,303,685 B1
(45) Date of Patent: Oct. 16, 2001

(54) WATER DISPERSED PRIMERS

(75) Inventor: James David Groves, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/558,464

(22) Filed: Apr. 25, 2000

(51) Int. Cl.$^7$ .............................. C08L 27/04; C08L 51/06; C08L 53/00
(52) U.S. Cl. ......................... 524/527; 524/504; 524/505; 524/507; 524/834; 524/836
(58) Field of Search ...................................... 524/492, 493, 524/504, 505, 507, 527, 834, 836

(56) References Cited

U.S. PATENT DOCUMENTS

| | | | |
|---|---|---|---|
| 5,298,552 | 3/1994 | Borghi et al. | 524/519 |
| 5,385,979 | * 1/1995 | Ozawa et al. | |
| 5,397,602 | 3/1995 | Martz et al. | 427/343 |
| 5,472,493 | 12/1995 | Regan | 106/491 |
| 5,492,963 | * 2/1996 | Ozawa et al. | |
| 5,962,576 | 10/1999 | Dehnicke et al. | 524/510 |
| 6,001,469 | 12/1999 | Verardi et al. | 428/423.1 |
| 6,008,286 | 12/1999 | Groves | 524/505 |

FOREIGN PATENT DOCUMENTS

| | | |
|---|---|---|
| 0 325 861 | 12/1988 | (EP) . |
| 0 539 710 A1 | 9/1992 | (EP) . |
| WO 93/03104 | 2/1993 | (WO) . |
| WO 94/28077 | 8/1994 | (WO) . |

OTHER PUBLICATIONS

"The Effects of Solvent and Thermal History on the Adhesion of Coatings to Thermoplastic Olefins" by Rose A. Ryntz, Waterborne, High Solids Powder Coatings Symposium, Univ. of Southern Mississippi, Feb. 22–24, 1995, p. 514.

"Water–Reducible Adhesion Promoters for Coatings on Polypropylene–based Substrates" by Jonathan E. Lawniczak et al, J. Coating Technology 65, No. 827, p. 21 (1993).

* cited by examiner

*Primary Examiner*—Tae H. Yoon
(74) *Attorney, Agent, or Firm*—Alan Ball; G. F. Chernivec; Gary L. Griswold

(57) ABSTRACT

A water dispersed primer composition comprising a solution of a halogenated hydrocarbon polymer in organic solvent; and a dispersing agent added to the solution to form a fluid primer to be dispersed in water to provide the water dispersed primer composition. The invention further includes a water based priming adhesive composition comprising an adhesive dispersion of a an adhesive polymer dispersed in water, and a primer mixed with the adhesive dispersion to form the priming adhesive. The primer comprises a solution of a halogenated hydrocarbon polymer in organic solvent and optionally a dispersing agent.

6 Claims, No Drawings

WATER DISPERSED PRIMERS

FIELD OF THE INVENTION

The present invention relates to primer compositions that may be mixed with water and water-based adhesives to provide a range of primers and priming adhesive compositions for bond improvement between polymers of similar or dissimilar types. More particularly the present invention relates primarily to water-based dispersions of surface modifying components for enhancing bond formation between substrates, such as polyolefins, which are known for low interfacial bond strength. Priming adhesives of the present invention improve adhesive bonding between materials without the application of surface pre-treatments.

BACKGROUND OF THE INVENTION

Adhesives provide a relatively rapid and convenient way for attaching one type of material to another. Over the years, development of adhesive systems has addressed ways to modify the strength of the adhesive bond between selected materials. Depending on the application, the adhesive of choice may include a pressure sensitive adhesive, a structural adhesive, a hot-melt adhesive or a repositionable adhesive. Regardless of the wide range of available adhesives, the surfaces of some commonly occurring polymer substrates still lack suitable adhesive affinity to form strong bonds with other materials, whether similar or dissimilar. Lack of bonding to surfaces with low adhesive affinity also affects the bonding and retention of surface coatings or printing inks that may be used for surface marking or decoration.

One solution to poor bond formation and poor retention of coatings and inks lies in the use of special treatments to change the condition of a surface by increasing its surface energy. Surface treatments for increased surface energy include oxidizing pretreatments or the use of adhesion promoters. Oxidizing pre-treatments include the use of flame, ultraviolet radiation, corona discharge, and chemical oxidizing agents and the like. Adhesion promoters include chemical compositions containing e.g. solutions of styrene-ethylene/butylene-styrene block copolymers or acrylate polymers in an organic solvent. These compositions improve the bonding of pressure sensitive adhesives and structural adhesives to polymer substrates.

Unfortunately, these methods for raising surface energy are not without problem. For example, chemical oxidizing agents are typically hazardous materials requiring special handling. Surface treatment using flame, corona discharge, etc. usually requires special equipment of a design more suited to sheet or film or web processing than to surface treatment of shaped articles.

Both oxidizing and adhesion promoter pre-treatments provide improvement in bond formation associated with low surface energy polymers such as polyethylene (PE), polypropylene (PP), ethylene-propylene-diene terpolymer (EPDM) and ethylene-alpha olefin copolymers. Substrates of this type may also include ethylene-vinyl acetate copolymers as representative of polymers that are substantially free from ethylenic unsaturation.

Polymeric substrates that have some degree of ethylenic unsaturation also benefit from the use of surface pre-treatments. It is known, for example, that rubbers comprising styrene/butadiene copolymers (SBR) require treatment with chlorinating agents including solutions of halogen donors such as trichloroisocyanuric acid, and N,N-dichlorobenzenesulfonamide, for improved bonding with adhesive bonding agents. Such halogen donors may be incorporated into primers or adhesives separately. The effectiveness of treatment by chlorination appears somewhat limited to substrates having a high level of ethylenic unsaturation such as polybutadiene, polyisoprene, natural rubber, styrene-butadiene copolymers, polychloroprene and the like. Also the addition of halogen donors reduces the stability of some adhesives, including polyurethane adhesives.

Further improvement in bonding to numerous types of substrates may be possible by abrading the surface of a substrate even before applying any pre-treatment. Mechanical means for surface roughening then represents a preliminary step to surface pre-treatments. Regardless of their effectiveness, pre-treatments represent an additional step in the process of manufacturing a product. Additional process steps incur additional time and expense and thereby add undesirable cost to a final product.

The development of primer pre-treatments, primarily in solvent, has yielded some improvement in adhesive bonding to low energy surfaces. U.S. Pat. No. 6,008,286, for example, provides compositions comprising mixtures of hydrocarbon polymers, halogen-substituted hydrocarbon polymers and substituted aliphatic isocyanates which, coated from solvent, improve the bond between low energy substrates and adhesives, coatings, printing inks and the like. The benefits of this primer and related solvent based primer compositions may be diminished by the need to limit volatile organic compounds (VOC) to a level that avoids health hazards and prevents environmental contamination.

Solvent based or aqueous based thermosettable primers may be used, for bond improvement, without a flame or corona preliminary treatment. U.S. Pat. No. 6,001,469 describes primers and topcoats of this type used with e.g. thermoplastic polyolefins (TPO) and reaction injection molded polyurethane (RIM). These materials may be suitably cured on the substrate at temperatures in the region of 130° C. for 30 minutes. Similarly WIPO publication WO 94/28077 describes aqueous-based compositions requiring heat treatment at 130° C. for 40 minutes. It is known (see e.g. R. Ryntz in "Waterborne, High Solids Powder Coatings Symposium," Univ. of Southern Mississippi 1995), that high temperature treatment may also affect the surface morphology of thermoplastic polyolefin polymers. Such changes may be beneficial in some cases, but in others the relatively high temperature for curing may be sufficiently close to the material melting point to produce substrate dimensional changes and associated problems.

Attempts to include primer compositions and/or adhesion promoter compositions with adhesive compositions, have met with limited success. According to an article in the Journal of Coating Technology, 65, No. 827 p. 21 (1993), it is known that chlorinated polyolefin primer compositions do not provide the same level of priming when included as an adhesive additive. Similarly, water based adhesive compositions and primers for polyolefins, described in U.S. Pat. No. 5,298,552, appear primarily useful for applications requiring bonding of polyolefin sheets to porous fibrous substrates such as water-absorbent paper board and similar paper pulp or wood fiber products. Also, in this case, the composition of the adhesive component of the formulations appears to have more impact on the bonding force developed between a polyolefin and absorbent substrate than the chlorinated polyolefin. It appears that common solvents, such as toluene, xylene etc. are unsuitable for use with compositions described in U.S. Pat. No. 5,298,552. Instead, the preferred solvent is relatively uncommon dodecyl benzene.

Known water based primer compositions derive their stability from the use of conventional surfactant materials to keep active components dispersed in the aqueous phase. The amount of surfactant requires careful control. Insufficient surfactant leads to instability and precipitation of the dispersed phase. Addition of too much surfactant produces a primer having poor adhesion to substrates that require priming. Good adhesion is essential to effective performance of priming compositions.

In view of the above described deficiencies associated with the use of known adhesive bonding agents, particularly the use of multiple treatments at substrate surfaces, the present invention has been developed to alleviate these drawbacks and provide further improvement and cost reduction. These enhancements and benefits are described in greater detail hereinbelow with respect to several alternative embodiments of the present invention.

SUMMARY OF THE INVENTION

The present invention in its several disclosed embodiments alleviates the drawbacks described above with respect to water dispersed primers and priming adhesive compositions and incorporates several additionally beneficial features. Of particular interest is the provision of primer solutions suitable for mixing with water and aqueous based adhesive dispersions to provide water dispersed primers and priming adhesive compositions. Depending upon the application, the variation of dispersed primer relative to dispersed adhesive produces a range of compositions from those functioning essentially as primers to others that contribute properties of priming and placement of an adhesive on a treated surface. Water dispersed primers and priming adhesives, according to the present invention, allow substantial reduction in the use of solvents. Solvent removal provides the benefit of substantial elimination of volatile organic compound (VOC) emission during improved processing and bond formation between polymer substrates. Improved processing refers to the elimination of pre-treatments, such as flame and corona treatments, when using primers and priming adhesives according to the present invention.

More specifically the present invention provides a water dispersed primer composition comprising a solution of a halogenated hydrocarbon polymer in organic solvent and a dispersing agent added to the solution to form a fluid primer to be dispersed in water to provide the water dispersed primer composition. Organic solvents may be selected from cyclohexane, heptane, hexane, xylene, toluene, chlorotoluene, mixed hydrocarbon solvents and mixtures thereof.

The present invention further includes a water based priming adhesive composition comprising an adhesive dispersion of an adhesive polymer dispersed in water, and a primer mixed with the adhesive dispersion to form the priming adhesive. The primer comprises a solution of a halogenated hydrocarbon polymer in organic solvent selected from the group consisting of cyclohexane, heptane, hexane, xylene, toluene, chlorotoluene, mixed hydrocarbon solvents and mixtures thereof. A primer composition may optionally contain a particulate dispersing agent.

The beneficial effects described above apply generally to water dispersed primers, priming adhesives and related compositions. Specific compositions providing these benefits will be described in detail hereinbelow.

DETAILED DESCRIPTION OF THE INVENTION

As required, detailed embodiments of the present invention are disclosed herein, however, it is to be understood that the disclosed embodiments are merely exemplary of the various and alternative forms of the invention. Therefore, specific structural and functional details disclosed herein are not to be interpreted as limiting, but merely as a basis for the claims and as a representative basis for teaching one skilled in the art to variously employ the present invention.

Water dispersed primers and priming adhesives, according to the present invention, may be produced by adding a solution of a primer, in organic solvent, to water, or to a water dispersed adhesive composition or to a solvent based adhesive. The resulting compositions improve adhesive bonding to surfaces known to have low affinity for adhesive bond formation. Adhesive bonding improves even in the absence of oxidizing pre-treatments and conventional adhesion promoters.

Commonly owned U.S. Pat. No. 6,008,286 provides solutions of surface priming compositions dissolved in organic solvents. These priming compositions improve bonding of e.g. adhesives, inks and other coatings to substrates including organic high polymers that can be synthetic or natural and typically include elastomeric materials.

The benefits of the previously discussed solutions of primers in organic solvent may be realized, according to the present invention, using primer compositions dispersed in water or aqueous adhesive dispersions. Combinations of differing quantities of primer solutions with water and water dispersed adhesives provide a range of compositions that either behave simply as surface primers or priming adhesives. Surfaces primed with these water-based dispersions participate in strong adhesive bond formation with similar and dissimilar substrates. Surface primers and priming adhesives may be applied by spraying, or brushing, or wiping, or any other conventional coating method, followed by drying, by evaporation, to produce a primed surface. The use of water dispersed primers and priming adhesives has been shown to eliminate the need for pre-treatment of substrate surfaces.

Substrates suitable for use with primers and priming adhesives according to the present invention include uniform polymeric sections, filled materials and foamed materials. They fall mainly into the two classes of ethylenically unsaturated materials and those containing little or no ethylenic unsaturation, as follows:

Substrates with ethylenic unsaturation include: polybutadiene, polyisoprene, styrene-butadiene copolymer, styrene-butadiene-styrene block copolymer.

Substrates with essentially no ethylenic unsaturation include ethylene-propylene-diene terpolymer (EPDM), styrene-ethylene-butylene-styrene block copolymer, ethylene-propylene rubber, butyl rubber, bromo-butyl rubber, ethylene-alpha olefin copolymer, polypropylene, polyethylene, polyethylene vinyl acetate, and synthetic leather and blends and mixtures thereof.

Water dispersed primer compositions contain active materials based upon halogenated hydrocarbon polymers dissolved in an organic solvent. A priming composition may also include non-halogenated hydrocarbon polymers as a blend with halogenated hydrocarbon polymers. Halogenated hydrocarbon polymers may also include functional groups such as sulfonate groups, carboxylic acid anhydride groups, hydroxyl groups, epoxide groups, carboxylic acid ester groups, carboxylic acid amide groups, carboxylic acid groups and the like. Suitable halogenated hydrocarbon polymers include chlorinated polyethylene, chlorinated polypropylene, chlorosulfonated polyethylene, maleic anhydride modified chlorinated polyethylene and blends and reaction products thereof. Preferred halogenated hydrocarbon polymers are chlorinated polypropylenes modified with maleic anhydride and available commercially as CP 343-1, available from Eastman Chemical Company, Kingsport Tenn., HARDLEN CY-9122P, available from Toyo Kasei Kogyo, Ltd., Osaka, Japan, and HYPALON CP-826, available from DuPont Dow Elastomers L.L.C., Wilmington Del.

Non-halogenated hydrocarbon polymers, suitable for blend formation with halogenated polymers, may also include functional groups such as: carboxylic acid anhydride groups; hydroxyl groups; epoxide groups; carboxylic acid ester groups; carboxylic acid amide groups; carboxylic acid groups and the like. Suitable polymers include styrene-ethylene/butylene-styrene triblock copolymers (e.g. KRATON G-1657 available from Shell Chemical Co., Houston Tex.), maleic anhydride modified styrene-ethylene/butylene-styrene triblock copolymers, maleic anhydride modified ethylene-propylene copolymers, maleic anhydride modified polypropylene, maleic anhydride modified ethylene vinyl acetate copolymers and ethylene/butylene copolymers having terminal hydroxy functionality. Preferred non-halogenated hydrocarbon, commercially available polymers include: KRATON FG-1901X; and HPVM 2203, both available from Shell Chemical Co., Houston Tex.; FUSABOND MC-190D, available from DuPont Canada Inc., Mississauga, Ontario, Canada; and an ethylene vinyl acetate copolymer containing 72% ethylene, available from Polysciences Inc., Warrington Pa.

Preferred primers and priming adhesives require addition of solutions of halogenated hydrocarbon polymers, and optionally their blends with non-halogenated hydrocarbon polymers, in organic solvent to water, water-dispersed adhesives and solution adhesives. Solvents used in the preparation of surface primer solutions include aliphatic hydrocarbons, aromatic hydrocarbons and halogenated derivatives thereof. Suitable solvents include cyclohexane, heptane, hexane, xylene, toluene, chlorotoluene and mixed hydrocarbon solvents, available from Shell Chemical Co., Houston Tex., as SHELL CYCLO SOL (R) 100 and SHELL CYCLO SOL (R) 150. Preferably, the organic solvent, for priming compositions, is a mixture including a weight ratio of from about 95:5 to about 5:95, more preferably from about 80:20 to about 20:80, and most preferably from about 60:40 to 40:60 of either cyclohexane or heptane combined with xylene or SHELL CYCLO SOL (R) 100 or SHELL CYCLO SOL (R) 150.

Solutions of halogenated hydrocarbon polymers, or their blends with non-halogenated hydrocarbon polymers in the solvent mixtures, have solids contents from about 0.5 wt. % to about 30 wt. %, preferably about 2.0 wt. % to about 15 wt. %. Solutions of this type may be added to water, water dispersed adhesives and solution adhesives to provide primers and priming adhesives according to the present invention. Preferably the solutions are dispersed in the dispersion medium using from about 0.1 wt. % to about 5.0 wt. % of a dispersing aid such as fumed silica. The ratio of a solution of primer to dispersion phase formulation may be from about 90:10 to about 10:90, preferably about 50:50 to about 15:85 and more preferably about 25:75 based on the weights of each material.

Dispersing agents provide stability to water based dispersions according to the present invention. Suitable dispersing agents include particulate materials and polymeric materials. Fumed silica is a preferred particulate dispersing agent. Examples of suitable fumed silica include AEROSIL 200, AEROSIL 300, AEROSIL 380, AEROSIL R-812 and AEROSIL R-972, all available from Degussa Corp., Ridgefield N.J. Polymeric dispersing agents include polyurethane polymers and acrylate polymers. A preferred polyurethane polymer dispersant is DISPERCOLL U-54, available from Bayer Corp., Pittsburgh Pa. An example of preferred polyacrylate dispersions is HYCAR 2671, available from B. F. Goodrich Performance Materials, Cleveland Ohio.

Optional additives for solutions containing primer, as described above, include: silane coupling agents; biocides; fingicides; optical brighteners; antioxidants; silica; pigments; dyes and acid scavengers, such as epoxy resins. Such additives, used alone or in combination, preferably represent less than 10 wt. % of the water dispersed formulations.

Fluid priming compositions of chlorinated hydrocarbon polymers, organic solvent, dispersing agent and optionally non-halogenated hydrocarbon polymers, when added with stirring to water produce water dispersed primers according to the present invention. Similar priming compositions, when added with stirring to water dispersed adhesives provide priming adhesive compositions according to the present invention. A comparable non-aqueous priming adhesive also forms upon addition of these priming compositions to solvent based adhesives.

Adhesives used for the preparation of priming adhesives include water dispersed adhesives and solvent-based or solution adhesives. Useful water dispersed adhesives include polyurethane latices and acrylate polymer latices and blends thereof. Suitable polyurethane latex adhesives comprise from about 35% to about 60% of polymer solids dispersed in water, including DISPERCOLL U-53, DISPERCOLL U-54 and BAYHYDROL DLN, all of which are available from Bayer Corp., Pittsburgh Pa. Acrylate latex adhesives, having from about 50% to about 65% of polymer solids in water, include HYCAR 2671, available from B. F. Goodrich Performance Materials, Cleveland Ohio, and RHOPLEX A-920, available from Rohm and Haas Chemical Company, Philadelphia Pa.

Solution adhesives, useful for the present invention, may be selected from a range of polyurethane adhesives containing from about 15 wt. % to about 30 wt. % solids dissolved in a solvent such as methyl ethyl ketone (MEK). Suitable commercially available polyurethane adhesives include DESMOCOLL 306, DESMOCOLL 530, DESMOCOLL KA8741, DESMOCOLL 620, DESMODUR CB-55N, and DESMODUR CB-72N, all available from Bayer Corp., Pittsburgh Pa.; PEARLSTICK 45-60/18, and PEARLSTICK 45-60/25, available from Aries Technologies Inc., Dervy N. H., and MORTHANE CA-100 series adhesives available from Rohm and Haas Inc., Philadelphia Pa.

For added hydrolytic stability and adhesive strength, polyurethane adhesives used herein may employ from about 3.0 wt. % to about 5.0 wt %, of the total composition, of a polyfunctional isocyanate crosslinker. Suitable materials for use in solution adhesives include: DESMODUR RFE, available from Bayer Corp., Pittsburgh Pa.; and/or IRODUR E-321 available from Rohm and Haas Inc., Philadelphia Pa. Crosslinkers used with aqueous-based latex adhesives include: DESMODUR DA; DESMODUR KA; DESMODUR 8703, all available from Bayer Corp., Pittsburgh Pa. Catalysts such as dialkyl tin carboxylates, metal acetyl acetonates, metal carboxylates, mixtures of metal acetyl acetonates with tertiary amines and the like may be used to accelerate reaction between crosslinkers and adhesive polymers.

EXPERIMENTAL

Primer Solution Preparation

EXAMPLE 1

A solvent mixture of 3.0 parts of cyclohexane to 2.0 parts of xylene was thoroughly dried over type 4A Grade molecular sieve (available from W. R. Grace and Company, Davison Chemical Div., Baltimore, Md.).

An amount of 2.0 g of maleic anhydride modified chlorinated polypropylene (HARDLEN CY-9122P, available from Toyo Kasei Kogyo Co. Ltd.) was dissolved in 31.5 g of the dried solvent mixture to provide a 6% solution of the polymer. Fumed silica (0.3 g of AEROSIL R-972, available from Degussa Corp., Ridgefield Park, N.J.) was added to the solution.

EXAMPLE 2

As for Example 1 except HARDLEN CY-9122P was replaced by a maleic anhydride modified chlorinated polypropylene designated CP-343-1 available from Eastman Chemical Company, Kingsport, Tenn.

EXAMPLE 3

As for Example 1 except in this case the maleic anhydride modified chlorinated polypropylene was HYPALON CP-826 available from DuPont Elastomers, Wilmington, Del.

EXAMPLE 4

A primer composition containing a blend of halogenated hydrocarbon polymers was prepared by mixing together equal amounts of Example 1 and Example 3.

EXAMPLE 5

As for Example 1 except HARDLEN CY-9 122P was replaced by a mixture of HARDLEN CY-9122P (1.6 g) with KRATON 1901X (0.4 g maleated styrene-ethylene/butylene-styrene block copolymer available from Shell Chemical Co. Houston Tex.).

EXAMPLE 6

As for Example 5 except for the replacement of KRATON 1901X with an ethylene/butylene copolymer diol HPVM 2203 also available from Shell Chemical Co.

EXAMPLE 7

As for Example 5 except for the replacement of KRATON 1901X with an ethylene vinyl acetate containing 72% ethylene, available from Polysciences Inc., Warrington, Pa.

EXAMPLE 8

As for Example 5 except for the replacement of KRATON 1901X with a maleated polyethylene vinyl acetate, available as FUSABOND MC-190 from DuPont Canada Inc., Mississauga, Ontario, Canada.

EXAMPLE 9

As for Example 5 except for the replacement of KRATON 1901X with a styrene-ethylene/butylene-styrene block copolymer, available as KRATON G-1657 from Shell Chemical Co.

EXAMPLE 10

This example was prepared by mixing 50 parts of the primer composition of Example 5 with 50 parts of the primer composition of Example 9.

EXAMPLE 11

Equal amounts of the primer compositions of Example 4 and Example 10 were mixed to provide a blend containing halogenated hydrocarbon polymers with non-halogenated hydrocarbon polymers.

EXAMPLE 12

As for example 5 except dried CYCLO SOL(R) 100 replaced xylene in the solvent mixture.

EXAMPLE 13

As for Example 12 without AEROSIL R-972 fumed silica.

Preparation of Primer Compositions Dispersed in Water

Each of the primer compositions of Examples 1–12 was converted into a water based primer dispersion by the addition, with stirring, of 3.0 g of a selected composition to 7.0 g distilled water. In all cases, the resulting dispersion remained stable for at least eight hours. Observation of some separation after about twelve hours was easily corrected by stirring or shaking to re-establish a stable dispersion.

Preparation of Primer Compositions Containing Adhesive Polymer Dispersed in Water

EXAMPLE 14

A 2% solids aqueous dispersion of a polyurethane adhesive was prepared by diluting 0.5 g of a 50% polyurethane latex adhesive (DISPERCOLL U-54, available from Bayer Corp., Pittsburgh Pa.) with 12 g distilled water. Addition of 3.0 g of Example 12 to 7.0 g of the diluted adhesive provided a stable primer composition that combined primer and adhesive dispersions. The dispersion was uniform and stable for at least twelve hours.

EXAMPLE 15

As for the water dispersed primer of Example 14 except for replacement of the diluted latex adhesive with a 2% solids aqueous dispersion made from 0.25 g of DISPERCOLL U-54 mixed with 0.25 g of a polyacrylate dispersion in water (HYCAR 2671 available from B. F. Goodrich Performance Materials, Cleveland Ohio). As before the mixed adhesive dispersion was diluted with 12 g of distilled water and 7.0 g of the product was used to disperse 3.0 g of the primer composition described in Example 12. A stable dispersion was obtained by stirring the primer composition into the diluted adhesive.

EXAMPLE 16

Prepared as for Example 14 using in place of Example 12 the composition of Example 13 which contained no fumed silica. The resulting dispersion was uniform and stable for about twelve hours.

EXAMPLE 17

A 2% solids aqueous dispersion of a polyacrylate was prepared by diluting 0.5 g of a 50% polyacrylate dispersion (HYCAR 2671) with 12 g of distilled water. Addition of 3.0 g of Example 13 to 7.0 g of the diluted polyacrylate dispersion provided a stable primer composition. Shaking or stirring corrected any phase separation that may have occurred in about twelve hours.

EXAMPLE 18

Prepared as for Example 15 using the primer composition of Example 13 in place of that of Example 12.

Preparation of Priming Adhesives Containing Polyurethane Adhesives Dispersed in Water EXAMPLES 19–27 were prepared by adding 3.0 g of the primer compositions of Examples 1–3 and 5–10, with stirring, to 7.0 g of DISPERCOLL U-54 (50% solids dispersion in water) to produce a stable dispersion of a priming adhesive in water.

Preparation of Priming Adhesives Containing Acrylate Adhesives Dispersed in Water

EXAMPLE 28

A stable uniform dispersion was made by dissolving HARDLEN 9122P (1.8 g) and KRATON 1901X (0.2 g) in a 31.5 g of a dried solvent mixture of 3 parts of cyclohexane to 2 parts of CYCLO SOL(R) 100. AEROSIL R-972 fumed silica (0.3 g) was added to the solution and the resulting dispersion (3.0 g) was added to 7.0 g of an acrylate latex designated as RHOPLEX A-920, available from Rohm & Haas Inc., Philadelphia Pa.

EXAMPLE 29

As for Example 29 except for the replacement of RHOPLEX A-920 with an acrylate latex designated HYCAR 2671 available from B. F. Goodrich Performance Materials, Cleveland, Ohio.

EXAMPLE 30

As for Example 29 except for the replacement of RHOPLEX A-920 with a 50:50 blend of RHOPLEX A-920 with DISPERCOLL U-54.

EXAMPLE 31

As for Example 30 except for the replacement of HYCAR 2671 with a 50:50 blend of HYCAR 2671 with DISPERCOLL U-54.

EXAMPLE 32

A mixture of CY-9122P (1.6 g) with KRATON 1901X (0.4 g maleated styrene-ethylene/butylene-styrene block copolymer—Shell Chemical Co. Houston Tex.) in dried mixed solvent as described in Example 1, was added to a polyurethane latex (7.0 g) designated BAYHYDROL DLN available from Bayer Corp., Pittsburgh, Pa., mixed with 0.35 g of a polyisocyanate designated DESMODUR KA8703 also from Bayer Corp. to provide a stable dispersion. This example provides a non-adhesive priming coating composition which bonds well to low surface energy substrates after drying at 60° C. for ten (10) minutes. Such coatings provide substrate coverage and protection for a variety of applications such as automotive applications.

EXAMPLE 33

A solution (3 g) containing HARDLEN CY-9122P in mixed, dried solvent as in Example 1 was added to DESMOCOLL 306 (7.0 g), a 20% solution of a polyurethane adhesive in methyl ethyl ketone containing 1.0 wt. % AEROSIL R-972 dispersed in the solution.

Test Results
Sample Preparation
Canvas Specimen Preparation

Canvas specimens were prepared from greige cotton (49×30 threads per inch) No. 10 duck ribbon, available from West Point Pepperell Inc., Palatine, Ill. by cutting the fabric into specimens 38 mm×100 mm×1 mm. Approximately 75 mm of the length of each specimen was coated by brush coating each specimen twice with an adhesive (DISPERCOLL U-54) thickened with 0.2% of BORCHIGEL L75N, a thickener available from Bayer Corp., Pittsburgh, Pa. with drying at 60° C. for fifteen (15) minutes. The samples after cooling were conditioned at room temperature for at least twenty four (24) hours.

Foam Specimen Preparation

Test specimens were made from injection molded polyethylene vinyl acetate (IMEVA) foam (ECLIPSE 2050), available from Kim Inc., Kyeong Nam, Korea. The test specimens measured 25.4 mm×127 mm×15 mm.

A solvent mixture of 3 parts of cyclohexane to 2 parts of xylene was applied to clean the surface of each test specimen using a solvent-saturated, lintless tissue (KIMWIPE available from Kimberly Clark Corp., Roswell, Ga.).

The cleaned foam specimens were dried at 60° C. for 10 minutes and coated, while still warm and between 35° C. and 45° C. with the water dispersed primers and priming adhesives previously described in Examples 1–12 and 14–27.

Test Sample Preparation

Canvas specimens, prepared as above, and foam specimens coated with water dispersed primers of Examples 1–12 and 14–18 were overcoated, at approximately the same time, with a brush coating of the adhesive of DISPERCOLL U-54 to which 4% by weight of a water dispersable polyisocyanate (DESMODUR KA8703) had been added with stirring. The coated materials were then dried at 60° C. for five (5) minutes. The adhesive coated sides of the canvas and foam specimens were bonded together under a pressure of approximately 10 KPascals before conditioning the bonded, laminated samples for approximately three (3) days under ambient conditions.

Examples 19–27, previously coated with priming adhesives as described above, were similarly bonded to adhesive coated canvas.

Alternative Test Sample Preparation

Test samples of Examples 16–18 were also prepared by bonding a foam specimen coated with priming composition, i.e. no additional adhesive, to a canvas specimen, overcoated with adhesive, (DISPERCOLL U-54 to which 4% by weight of a water dispersable polyisocyanate (DESMODUR KA8703) had been added with stirring).

Peel Adhesions

Each of the laminated samples was subjected to 180° peel testing using a peel tester available from Instron Corp., Canton Mass. The peel tester operated at a jaw separation speed of 12.7 cm per minute and at least three samples of each of Examples 1–12 and 14–27 were submitted to testing.

Results

Examples 1–12 and 14–27 exhibited adhesions of at least 354 N/100 mm with internal failure of the substrate and not the adhesive bond. This indicates strong bond formation between dissimilar materials without pre-treating the surfaces as by plasma.

Acrylate Series Adhesives

Specimens of Examples 28–31 were prepared in similar to fashion to Examples 1–12 and 14–27.

Results

Examples 28 and 29 gave peel values of 63 N/100 mm, and 58 N/100 mm thereby demonstrating effective priming of the IMEVA foam substrate and adhesion of the canvas thereto. Examples 30 and 31 recorded values of at least 354 N/100 mm with internal failure of the substrate polymer.

Alternative Test Surfaces

An ethylene/1-octene polymer elastomer (POE) available as ENGAGE 8003 from DuPont Dow Elastomers L.L.C., Wilmington, Del. was converted into test specimens 100 mm×25 mm×6 mm. A thermoplastic polyolefin polymer (TPO) available as ETA 3163 from Himont USA Inc., Lansing, Mich. was converted into test specimens 100 mm×25.4 mm×3.5 mm. A vulcanized ethylene propylene diene terpolymer (EPDM) available as SHORE A-6 from Shin Ho Inc., Pusan, Korea, was converted into test specimens 127 mm×25.4 mm×2.5 mm.

All test specimens were cleaned, dried at 60° C. for 10 minutes as previously described and coated, while still warm, with the latex bonding agent of Example 22. Canvas specimens, as previously described, were laminated, with adhesive to adhesive bonding, to the specimens coated with Example 22. After conditioning the laminated samples were subjected to 180° peel testing.

Results

POE—447 N/100 mm
TPO—252 N/100 mm
EPDM—271 N/100 mm

| Composition of Styrene-Butadiene Rubber (SBR) | |
| --- | --- |
| SBR 1502 | 65 parts |
| SBR 1904 | 35 parts |
| | 100 parts |
| Silica | 20 phr |
| Carbon black | 25 phr |
| Sulfur | 1.8 phr |
| Coumarone-Indene Resin | 3.0 phr |
| Zinc Oxide | 3.8 phr |
| Stearic Acid | 1.8 phr |
| N-cyclohexyl-2-benzothiazolsulfonamide | 1.1 phr |
| Phenolic antioxidant | 0.8 phr |

A rubber having the composition indicated above was compounded and converted into plaques by Rubber Industries Inc., Shakopee, Minn. Specimens 127 mm×25.4 mm×3.1 mm were prepared for testing. Each specimen of SBR rubber was primed with a solution of 2% trichloroisocyanuric acid in dry ethyl acetate. The primed samples were conditioned at ambient conditions for about 30 minutes before applying adhesives as described for the preparation of canvas specimens. Specimens of POE and IMEVA foam were coated with the latex bonding agent of Example 22 before drying, along with the adhesive coated SBR specimens, at 60° C. for five (5) minutes. After adhesive to adhesive lamination, bond strength was tested using 180° peel.

Results

POE/SBR—307 N/100 mm
IMEVA/SBR—360 N/100 mm
IMEVA/POE—406 N/100 mm

Priming Coating Compositions

The priming effect of priming compositions, according to the present invention, may also be imparted to coating compositions. A water dispersed priming coating composition, as in Example 32 was coated on thermoplastic polyolefin polymer (TPO) available as ETA 3163 from Himont USA Inc., Lansing, Mich. in the form of test specimens 110 mm×25.4 mm×3.5 mm that had been previously cleaned and heated to evaporate the cleaner. The coating was applied while the specimens were still warm, followed by drying at 60° C. for ten (10) minutes. Control samples, omitting the primer solution, were prepared using the same procedure. All specimens were conditioned at room temperature for about twenty four (24) hours.

A new razor blade was used for producing intersecting horizontal and vertical score marks having a separation of approximately 1.0 mm. A length of adhesive tape (Scotch™ Brand 810 Magic™ Tape available from 3M Company, St. Paul Minn.) was placed in firm adhesive contact with the coating before removal by rapid peeling with a single continuous pulling action. Four fresh samples of tape were removed in this way from the bonded coatings.

Results

Two of three samples coated with the priming coating of Example 32 showed no coating removal. The third sample lost only three of the tiny squares, produced by the scoring procedure. In contrast, the control samples could not be tested because they released from the TPO surface without showing any evidence of bonding.

Organic Solvent-Based Priming Adhesives
Canvas Specimen Preparation

Canvas specimens were prepared from greige cotton (49×30 threads per inch) No. 10 duck ribbon, available from West Point Pepperell Inc., Palatine, Ill. by cutting the fabric into specimens 38 mm×100 mm×1 mm. Approximately 75 mm of the length of each specimen was coated by brush coating each specimen twice with an adhesive (DESMOCOLL 306) thickened with 1.0% of AEROSIL 972 fumed silica, and 3% by weight of a polyisocyanate available as IRODUR E-321, from Rohm and Haas Inc., Philadelphia Pa. with drying at 60° C. for fifteen (15) minutes. The samples after cooling were conditioned at room temperature for at least twenty four (24) hours.

Foam Specimen Preparation

Test specimens were made from injection molded polyethylene vinyl acetate (IMEVA) foam (ECLIPSE 2050), available from Kim Inc., Kyeong Nam, Korea. The test specimens measured 25.4 mm×127 mm×15 mm.

A solvent mixture of 3 parts of cyclohexane to 2 parts of xylene was applied to clean the surface of each test specimen using a solvent-saturated, lintless tissue (KIMWIPE available from Kimberly Clark Corp., Roswell, Ga.).

The cleaned foam specimens were dried at 60° C. for 10 minutes and coated, while still warm and between 35° C. and 45° C. with the solvent based adhesive of Example 33.

Test Sample Preparation

Canvas specimens and foam specimens coated with solvent-based adhesives, were prepared at approximately the same time and then dried at 60° C. for seven (7) minutes. The adhesive coated sides of the canvas and foam specimens were bonded together under a pressure of approximately 10 KPascals before conditioning the bonded, laminated samples for approximately three (3) days under ambient conditions.

Results

All test specimens exhibited 180° peel adhesions of at least 360 N/100 mm indicating substrate failure with the adhesive bond still intact. This provides examples of adhesive formulations suitable for applying directly to organic polymer substrates without oxidizing or similar pretreatment.

Primer compositions according to the present invention may be used for bonding polymeric substrates together or bonding polymeric substrates to other types of substrate such as those comprising metal, glass, ceramic, wood, and woven and non-woven fabrics, and the like. The bonding of polymer substrates to fabrics finds use in the manufacture of a wide variety of articles of clothing including footwear, particularly athletic footwear where secure bonding of fabric to elastomeric shoe components is important to the production of a lightweight high performance shoe. Common materials used for athletic shoe manufacture include fabrics, polymer mid-soles and durable outer soles. Suitable fabrics include natural or synthetic leather, nylon, cotton and the like. Foamed mid-soles include polymers, copolymers, and blends and mixtures thereof, based on monomers including ethylene vinyl acetate, ethylene/1-octene, propylene and suitable diene monomers. Preferred polymers and copolymers include polyethylene vinyl acetate (EVA) and ethylene-propylene-diene (EPDM) elastomers. Materials suitable as durable outer soles include the thermosetting polymers of vulcanized rubbers such as styrene-butadiene rubbers (SBR), styrene-butadiene-styrene (SBS) block copolymer rubbers and ethylene-propylene-diene (EPDM) rubbers.

As indicated above, primers and priming adhesives according to the present invention contribute to strong adhesive bonding of durable rubber outer sole materials to foamed mid-sole materials to produce a composite sole or stock that bonds strongly to material used for shoe upper after primer or priming adhesive treatment. In addition, the water dispersed primers and priming adhesives provide low hazard, low VOC containing products for safe use by workers who apply such products, usually by brushing or open spray techniques, during labor intensive manufacturing operations.

Water dispersed primers and priming adhesives and related solvent based systems have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A water dispersed primer composition comprising:
   a solution of a chlorinated hydrocarbon polymer in organic solvent;
   a non-halogenated hydrocarbon polymer blended with said chlorinated hydrocarbon polymer in said solution; and
   a dispersing agent added to said solution to form a fluid primer to be dispersed in water to provide said water dispersed primer composition, said organic solvent selected from the group consisting of cyclohexane, heptane, hexane, xylene, toluene, chlorotoluene, mixed hydrocarbon solvents, and mixtures thereof.

2. A water dispersed primer composition according to claim 1 wherein said non-halogenated hydrocarbon polymer is selected from the group consisting of styrene-ethylene/butylene-styrene triblock copolymers, ethylene vinyl acetate copolymers, maleic anhydride modified styrene-ethylene/butylene-styrene triblock copolymers, maleic anhydride modified ethylene-propylene copolymers, maleic anhydride modified polypropylene, maleic anhydride modified ethylene vinyl acetate copolymers, and ethylene/butylene copolymers having terminal hydroxy functionality.

3. A water based priming adhesive composition comprising:
   an adhesive dispersion of a an adhesive polymer dispersed in water; and
   a primer mixed with said adhesive dispersion to form said priming adhesive said primer comprising, a solution of a chlorinated hydrocarbon polymer in organic solvent selected from the group consisting of cyclohexane, heptane, hexane, xylene, toluene, chlorotoluene, mixed hydrocarbon solvents, and mixtures thereof; and
   a non-halogenated hydrocarbon polymer blended with said chlorinated hydrocarbon polymer.

4. A water based priming adhesive composition according to claim 3 wherein said non-halogenated hydrocarbon polymer is selected from the group consisting of styrene-ethylene/butylene-styrene triblock copolymers, ethylene vinyl acetate copolymers, maleic anhydride modified styrene-ethylene/butylene-styrene triblock copolymers, maleic anhydride modified ethylene-propylene copolymers, maleic anhydride modified polypropylene, maleic anhydride modified ethylene vinyl acetate copolymers, and ethylene/butylene copolymers having terminal hydroxy functionality.

5. A water dispersed primer composition comprising:
   a solution of a chlorinated hydrocarbon polymer in organic solvent;
   a non-halogenated hydrocarbon polymer blended with said chlorinated hydrocarbon polymer in said solution wherein said non-halogenated hydrocarbon polymer is selected from the group consisting of styrene-ethylene/butylene-styrene triblock copolymers, ethylene vinyl acetate copolymers, maleic anhydride modified styrene-ethylene/butylene-styrene triblock copolymers, maleic anhydride modified ethylene-propylene copolymers, maleic anhydride modified polypropylene, maleic anhydride modified ethylene vinyl acetate copolymers, and ethylene/butylene copolymers having terminal hydroxy functionality; and
   a particulate dispersing agent added to said solution to form a fluid primer to be dispersed in water to provide said water dispersed primer composition, said organic solvent selected from the group consisting of cyclohexane, heptane, hexane, xylene, toluene, chlorotoluene, mixed hydrocarbon solvents, and mixtures thereof.

6. A water based priming adhesive composition comprising:
   an adhesive dispersion of a an adhesive polymer dispersed in water; and
   a primer mixed with said adhesive dispersion to form said priming adhesive said primer comprising, a solution of a chlorinated hydrocarbon polymer in organic solvent and a particulate dispersing agent added to said solution, said organic solvent selected from the group consisting of cyclohexane, heptane, hexane, xylene, toluene, chlorotoluene, mixed hydrocarbon solvents, and mixtures thereof; and
   a non-halogenated hydrocarbon polymer blended with said chlorinated hydrocarbon polymer wherein said non-halogenated hydrocarbon polymer is selected from the group consisting of styrene-ethylene/butylene-styrene triblock copolymers, ethylene vinyl acetate copolymers, maleic anhydride modified styrene-ethylene/butylene-styrene triblock copolymers, maleic anhydride modified ethylene-propylene copolymers, maleic anhydride modified polypropylene, maleic anhydride modified ethylene vinyl acetate copolymers, and ethylene/butylene copolymers having terminal hydroxy functionality.

* * * * *